US010645335B2

(12) United States Patent
Abe

(10) Patent No.: US 10,645,335 B2
(45) Date of Patent: May 5, 2020

(54) IMAGING APPARATUS FOR GENERATING A SINGLE FILE OF TWO SHOOTING PERIODS

(71) Applicant: Panasonic Intellectual Property Management Co., Ltd., Osaka (JP)

(72) Inventor: Kazuya Abe, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 15/798,188

(22) Filed: Oct. 30, 2017

(65) Prior Publication Data

US 2018/0278884 A1    Sep. 27, 2018

(30) Foreign Application Priority Data

Mar. 22, 2017  (JP) ................................. 2017-055242
Sep. 5, 2017   (JP) ................................. 2017-170000

(51) Int. Cl.
| H04N 5/232 | (2006.01) |
| H04N 5/92 | (2006.01) |
| H04N 5/91 | (2006.01) |
| H04N 5/77 | (2006.01) |
| H04N 5/907 | (2006.01) |

(52) U.S. Cl.
CPC ....... *H04N 5/9205* (2013.01); *H04N 5/23229* (2013.01); *H04N 5/23245* (2013.01); *H04N 5/232933* (2018.08); *H04N 5/772* (2013.01); *H04N 5/91* (2013.01); *H04N 5/907* (2013.01)

(58) Field of Classification Search
CPC ............ H04N 5/9205; H04N 5/23245; H04N 5/23229
See application file for complete search history.

(56) References Cited

U.S. PATENT DOCUMENTS

| 9,686,463 | B2* | 6/2017 | Deng ........................ G06T 7/80 |
| 9,800,770 | B2* | 10/2017 | Tung ...................... H04N 5/765 |
| 10,148,993 | B2* | 12/2018 | Arms ................... H04N 21/231 |
| 2010/0278506 | A1* | 11/2010 | Subbian ................... H04N 7/18 386/223 |
| 2011/0221916 | A1* | 9/2011 | Kuriyama .......... H04N 5/23216 348/220.1 |

(Continued)

FOREIGN PATENT DOCUMENTS

| JP | 2005-006059 A | 1/2005 |
| JP | 2010-136191 A | 6/2010 |
| WO | WO 2016/017138 A1 | 2/2016 |

*Primary Examiner* — Hung H Lam
(74) *Attorney, Agent, or Firm* — Renner, Otto, Boisselle & Sklar, LLP

(57) ABSTRACT

The present disclosure provides an imaging apparatus that shoots a video. The imaging apparatus includes an imaging unit that generates image data based on optical information input through an optical system; an image processor that generates video data based on the image data; and a controller that, when a shooting period in which a video is shot has a first shooting period from a start of first recording till an end of the first recording and a second shooting period from a start of second recording till an end of the second recording, generates a single file using, out of the video data, first video data corresponding to the video shot during the first shooting period and second video data corresponding to the video shot during the second shooting period.

4 Claims, 16 Drawing Sheets

(56) References Cited

U.S. PATENT DOCUMENTS

| | | | | |
|---|---|---|---|---|
| 2012/0218406 A1* | 8/2012 | Hanina | ................... | G06F 3/017 |
| | | | | 348/143 |
| 2012/0308209 A1* | 12/2012 | Zaletel | ................. | G11B 27/034 |
| | | | | 386/278 |
| 2013/0084053 A1* | 4/2013 | Ackermann | ..... | H04N 21/23424 |
| | | | | 386/241 |
| 2016/0006922 A1* | 1/2016 | Boudreau | .......... | H04N 5/23206 |
| | | | | 348/207.1 |
| 2016/0080686 A1* | 3/2016 | Oyama | .............. | H04N 5/23245 |
| | | | | 386/226 |
| 2016/0344933 A1 | 11/2016 | Mukai et al. | | |
| 2017/0085804 A1 | 3/2017 | Mukai et al. | | |
| 2017/0324888 A1* | 11/2017 | Boone | ..................... | H04N 5/04 |

* cited by examiner

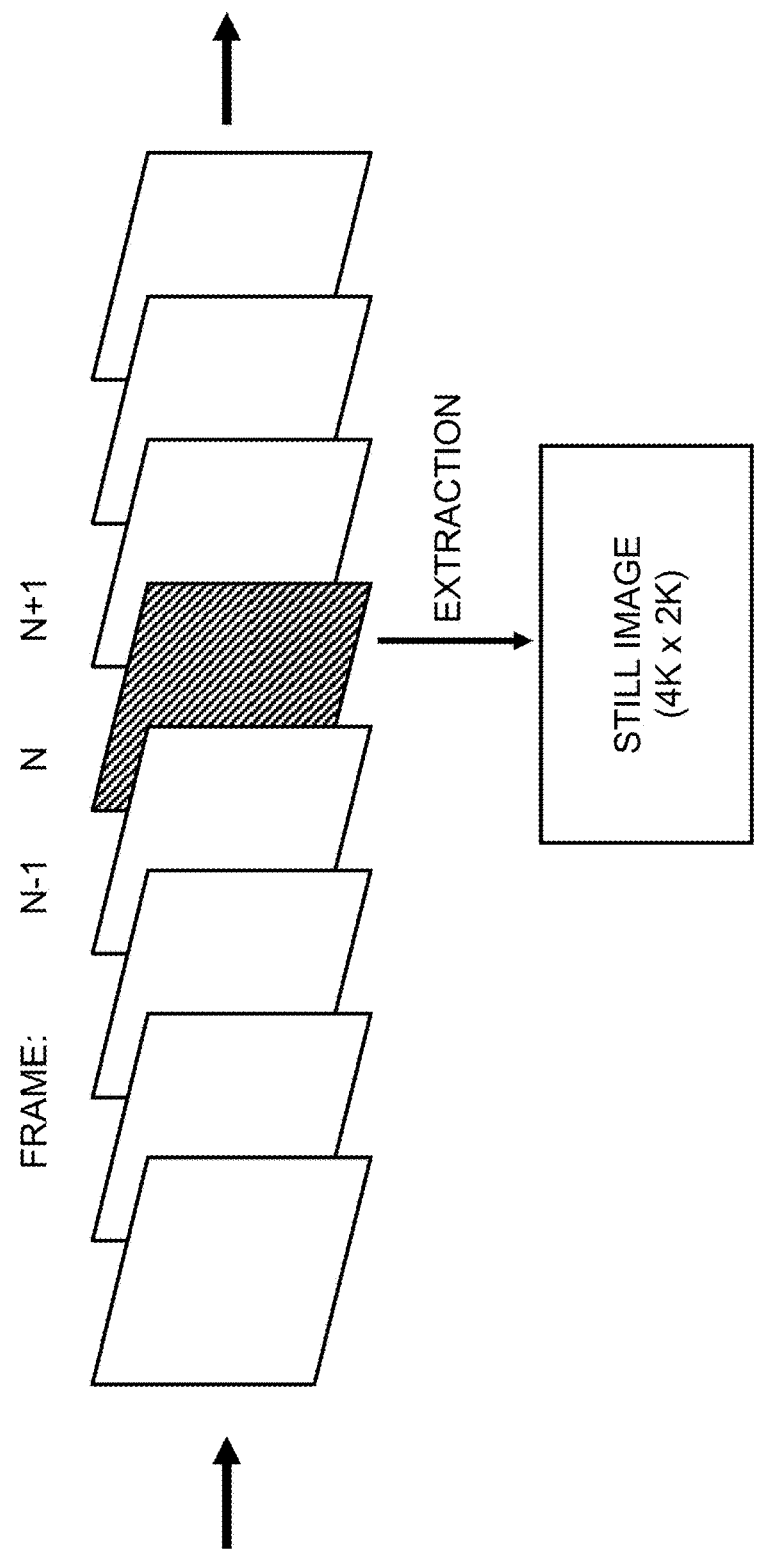

FIG. 4

|  | NORMAL VIDEO MODE | VIDEO PHOTO MODE |
|---|---|---|
| IMAGE QUALITY SETTING | VGA-4K | 4K |
| FRAME RATE | 24p/25p/30p | 30p |
| TONE SETTING | NORMAL | SETTING FOR STILL IMAGE |
| EXPOSURE SETTING | P/A/S/M | SHUTTER SPEED PRIORITY (SHUTTER SPEED IS LESS THAN FRAME PREIOD) |
| BRIGHTNESS LEVEL | 16-235<br>16-255<br>0-255 | 0-255<br>(SAME AS PHOTO) |
| ASPECT RATIO OF IMAGE | 16:9 | 16:9/4:3/3:2/1:1 |
| UPPER LIMIT OF AUTO ISO | NORMAL | HIGHER THAN VALUE IN NORMAL VIDEO MODE |
| AF TRACKING SPEED | NORMAL | HIGHER THAN VALUE IN NORMAL VIDEO MODE |
| WB TRACKING SPEED | NORMAL | HIGHER THAN VALUE IN NORMAL VIDEO MODE |
| AE TRACKING SPEED | NORMAL | HIGHER THAN VALUE IN NORMAL VIDEO MODE |

FIG. 16

|  |  | WAITING TIME (ms) | |
|---|---|---|---|
|  |  | FIRST EXEMPLARY EMBODIMENT | COMPARATIVE EXAMPLE |
| $T_s \leq T_a$ | | 0 | (i) - (vi)<br>MAXIMUM 1770ms |
| $T_s > T_a$ | EMPHASIS ON SPEED | 0 | (i),(ii)<br>MAXIMUM 1000ms |
|  | EMPHASIS ON POWER SAVING | (i),(iii),(iv),(v),(vi)<br>MAXIMUM 1270ms | (i) - (vi)<br>MAXIMUM 1770ms |

IMAGING APPARATUS FOR GENERATING A SINGLE FILE OF TWO SHOOTING PERIODS

BACKGROUND

1. Technical Field

The present disclosure relates to an imaging apparatus that generates an image of a subject.

2. Description of the Related Art

In general, in order to shoot a still image, a user holds an imaging apparatus, focusing attention on a photo opportunity, and presses a release button at a desired photo opportunity to shoot an image at the desired moment. However, a conventional imaging apparatus captures an image at the moment when a release button is pressed, so that it is difficult to capture a state, at a desired moment, of happenings or accidents which can happen at any time or of a subject (liquid, fire, etc.) which changes over time.

According to Unexamined Japanese Patent Publication No. 2016-032214, a user can extract a desired still image from a video. Therefore, the user can generate, without concern for a photo opportunity, an image shot at the decisive moment which has been conventionally difficult.

SUMMARY

The present disclosure provides an imaging apparatus that shoots a video. The imaging apparatus includes an imaging unit, an image processor, and a controller. The imaging unit generates image data based on optical information input through an optical system. The image processor generates video data based on the image data. When a shooting period in which the video is shot has a first shooting period from a start of first recording till an end of the first recording and a second shooting period from a start of second recording till an end of the second recording, the controller generates a single file using, out of the video data, first video data corresponding to the video shot during the first shooting period and second video data corresponding to the video shot during the second shooting period.

When shooting a video several times, the imaging apparatus according to the present disclosure records video data sets corresponding to videos shot during the several shooting periods into a single file. Accordingly, the imaging apparatus is effective to prevent the user from missing a photo opportunity.

BRIEF DESCRIPTION OF DRAWINGS

FIG. 3 is a view for describing a step of extracting a still image from video data;

FIG. 4 is a diagram for describing various setting conditions in each of a normal video mode and a video photo mode;

FIG. 16 is diagram for comparing a waiting time between the imaging apparatus according to the exemplary embodiment of the present invention and an imaging apparatus according to a comparative example based on a conventional method.

DETAILED DESCRIPTION

Hereinafter, exemplary embodiments will be described in detail with reference to the drawings as appropriate. However, descriptions in more detail than necessary may be omitted. For example, the detailed description of already well-known matters and the overlap description of substantially identical configurations may be omitted. This is to avoid an unnecessarily redundant description below and to facilitate understanding of those skilled in the art.

Here, the inventor provides the attached drawings and the following description such that those skilled in the art can sufficiently understand the present disclosure, and therefore, they do not intend to restrict the subject matters of claims.

The exemplary embodiments of an imaging apparatus of the present disclosure will be described below with reference to the drawings.

First Exemplary Embodiment

1. Configuration of Digital Camera

Figure 1:
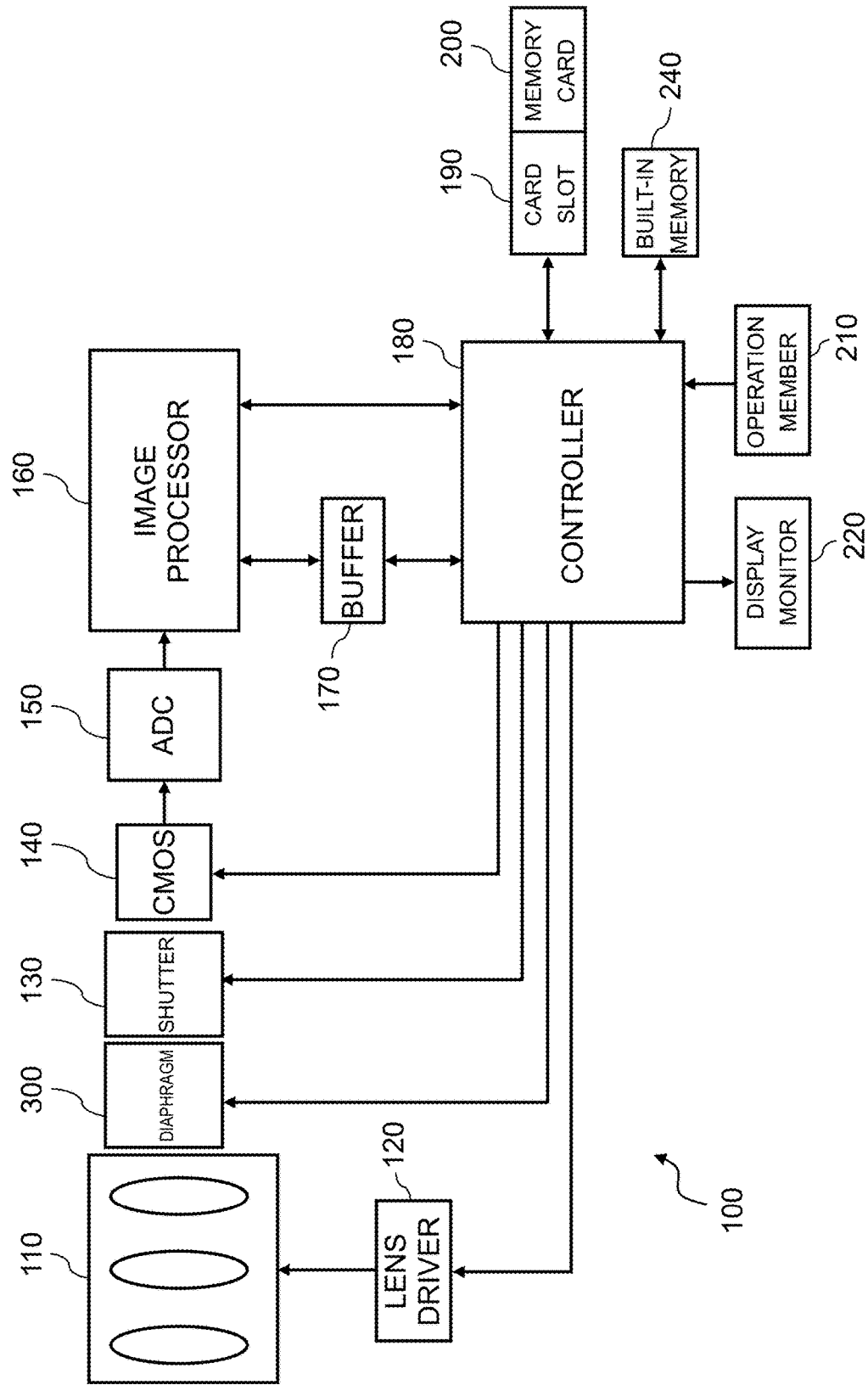
FIG. 1 is a diagram illustrating a configuration of a digital camera according to an exemplary embodiment of the present invention.

An example of an electrical configuration of a digital camera according to a first exemplary embodiment will be described with reference to FIG. 1. FIG. 1 is a block diagram illustrating a configuration of digital camera 100. Digital camera 100 is an imaging apparatus that captures a subject image formed via optical system 110 composed of one or more lenses by means of complementary metal-oxide semiconductor (CMOS) imaging device 140.

Image data generated by CMOS imaging device 140 is subjected to various types of processing by image processor 160 and is then stored in memory card 200. The configuration of digital camera 100 will be described in detail below.

Optical system 110 includes a zoom lens and a focus lens. The subject image can be enlarged or reduced by moving the zoom lens along an optical axis. Furthermore, a focus on the subject image can be adjusted by moving the focus lens along the optical axis.

Lens driver 120 drives various kinds of lenses included in optical system 110. Lens driver 120 includes, for example, a zoom motor that drives the zoom lens and a focus motor that drives the focus lens.

Diaphragm 300 adjusts a size of an aperture for light according to a user's setting or automatically to thereby adjust an amount of light transmitting through the aperture.

Shutter 130 is a unit for shielding light to be transmitted to CMOS imaging device 140. Shutter 130, optical system 110, and diaphragm 300 constitute an optical system unit that controls optical information indicating the subject image.

CMOS imaging device 140 captures the subject image formed by optical system 110, and generates image data. CMOS imaging device 140 includes a color filter, a light-receiving element, and an auto gain controller (AGC). The light-receiving element converts an optical signal of light collected by interchangeable lens 101 into an electrical signal and generates image information. The AGC amplifies the electrical signal output from the light-receiving element. CMOS imaging device 140 further includes a drive circuit and the like that perform various kinds of operations such as exposure, transfer, and electronic shutter.

Analog-digital converter (A/D converter: ADC) 150 converts analog image data generated by CMOS imaging device 140 into digital image data.

Based on control of controller 180, image processor 160 performs various types of processing on the digital image data generated by CMOS imaging device 140 and converted. Image processor 160 generates image data to be displayed on display monitor 220 and generates image data to be stored in memory card 200. For example, image processor 160 performs various types of processing such as Gamma correction, white balance correction, and damage correction, on the image data generated by CMOS imaging device 140. Furthermore, image processor 160 compresses the image data generated by CMOS imaging device 140 according to a compression format that complies with H.264 standards or MPEG2 standards. Image processor 160 can be implemented, for example, by a digital signal processor (DSP) or a microcontroller. Furthermore, image processor 160 can generate video data (4K moving image data) of approximately 4000×2000 pixels based on the image data generated by CMOS imaging device 140. Image processor 160 can perform various types of processing described below on the generated 4K moving image data.

Controller 180 is a control unit that entirely controls digital camera 100. Controller 180 can be achieved by a semiconductor element, for example. Controller 180 may be configured by hardware alone or may be achieved by a combination of hardware and software. Controller 180 can be achieved by, for example, a microcontroller, a central processing unit (CPU), a micro processing unit (MPU), an application specific integrated circuit (ASIC), or a field-programmable gate array (FPGA).

Buffer 170 functions as a work memory of image processor 160 and controller 180. Buffer 170 can be implemented by, for example, a dynamic random access memory (DRAM) or a ferroelectric memory.

Card slot 190 is capable of detachably accepting memory card 200. Memory card 200 can be mechanically and electrically connected to card slot 190.

Memory card 200 includes inside a flash memory or a ferroelectric memory and can store data such as image files generated by image processor 160. Memory card 200 corresponds to a storage unit in the present disclosure.

Built-in memory 240 is, for example, a flash memory or a ferroelectric memory. Built-in memory 240 stores a control program for controlling entire digital camera 100, and the like.

Operation member 210 is a generic term of a user interface that receives a user's operation. A selection button, a determination button, and the like receiving a user's operation correspond to operation member 210.

Display monitor 220 can display an image (a through image) indicated by the image data generated by CMOS imaging device 140 and an image indicated by image data read from memory card 200. Display monitor 220 can also display various menu screens for making various settings of digital camera 100. Display monitor 220 is configured by a liquid crystal display device or an organic electro luminescence (EL) display device.

Figure 2:
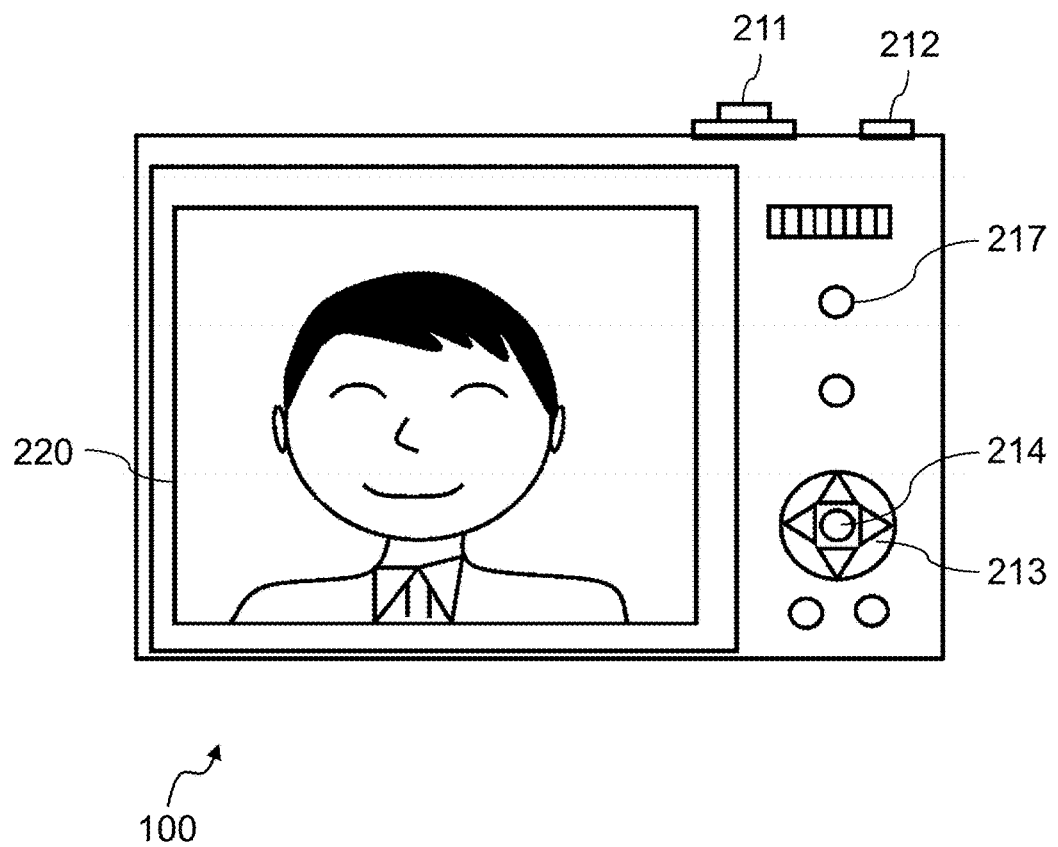
FIG. 2 is a back view of the digital camera.

FIG. 2 is a view illustrating a back surface of digital camera 100. Operation member 210 in FIG. 1 includes a member receiving a user's operation, such as a button, a lever, a dial, or a touch panel. For example, operation member 210 includes release button 211, power supply button 212, selection button 213, determination button 214, video record button 217, and the like, as illustrated in FIG. 2. Upon receipt of the user's operation, operation member 210 transmits various instruction signals to controller 180.

Release button 211 is a two-stage pressing type push button. When a user presses release button 211 halfway down, controller 180 executes, for example, autofocus control (AF control) or auto exposure control (AE control). When the user presses release button 211 fully down, controller 180 records image data captured at a timing of the pressing operation as a recording image in, for example, memory card 200.

Power supply button 212 is a push button operated by a user to issue an instruction to supply power to the components of digital camera 100. When power supply button 212 is pressed by a user while in a power-off state, controller 180 supplies power to the components of digital camera 100 from a power supply to activate these components. When power supply button 212 is pressed by the user while in a power-on state, controller 180 stops supply of power to the components from the power supply.

Selection button 213 includes up, down, left, and right push buttons. By pressing any one of up, down, left, and right push buttons of selection button 213, the user can move a cursor or select various condition items displayed on display monitor 220.

Determination button 214 is a push button. When the user presses determination button 214 while digital camera 100 is in a shooting mode or a playback mode, controller 180 displays a menu screen on display monitor 220. The menu screen is a screen for setting various conditions for shooting and playback. When determination button 214 is pressed down while any of various condition setting items is being selected, controller 180 determines the setting of the selected item.

2. Operation of Digital Camera

Digital camera 100 according to the present exemplary embodiment has, as an operating mode, a video recording mode for shooting and recording a video and a playback mode for playing the recorded video. In addition, the video recording mode includes two video modes which are a normal video mode (one example of a first video mode) for shooting a normal video and a video photo mode (one example of a second video mode) for shooting a video that enables extraction of a high-quality still image.

2.1 Video Photo Mode

The video photo mode is for shooting a video from which a still image is to be extracted. As illustrated in FIG. 3, a video shot in the video photo mode is constituted by multiple frame images. When one of the frame images is selected (extracted), the selected frame image is recorded as a still image. Note that a video shot in the normal video mode is also constituted by multiple frame images, and any one of the multiple frame images can be recorded as a still image. However, in the video photo mode, a video is recorded under a setting condition more suitable for a still image than in the normal video mode.

A user can extract an image (frame image) of a desired scene from the video shot in the video photo mode described above as a still image. Therefore, the user can shoot a video without concern for a photo opportunity, and after shooting, he/she can select a desired image from frame images constituting the shot video. This enables generation of an image shot at the decisive moment, which has been conventionally difficult. Specifically, a state, at a desired moment, of happenings or accidents which can happen at any time or of a subject (liquid, fire, etc.) which changes over time can easily be captured.

In a video shot in the video photo mode, an individual frame image constituting the video is extracted as a still image. Therefore, priority is given to grade and quality (hereinafter expressed as image quality) of an image extracted as a still image over image quality as a video. Therefore, when digital camera 100 is set to the video photo mode, various setting conditions regarding shooting are automatically (forcibly) set to setting conditions unique to the video photo mode suitable for a still image. FIG. 4 illustrates setting conditions unique to the video photo mode, in comparison to the setting conditions in the normal video mode. In the setting unique to the video photo mode, various setting conditions are set to values for improving image quality of a still image extracted from a video.

For example, in the normal video mode, image quality setting (resolution) is set to assume a value designated by a user within a range from Video Graphics Array (VGA) to 4K (about 4000×2000 pixels). On the other hand, in the video photo mode, the image quality setting (resolution) is set to be 4K which is the highest resolution settable to digital camera 100. According to this setting, recording of a high-quality frame image is enabled, and extraction of a high-quality still image is enabled. Note that the image quality setting in the video photo mode is not limited to be 4K of about 4000×2000 pixels. If the video photo mode is a video mode with higher resolution, a still image with higher image quality can be obtained. For example, digital camera 100 may be configured such that image quality setting in the video photo mode is set to be 8K of 8000×4000 pixels.

Further, in the normal video mode, a frame rate of a video is set to be a value designated by the user from 24 p, 25 p, and 30 p. On the other hand, in the video photo mode, the frame rate is set to be 30 p which is the highest frame rate. When the frame rate is set to be high, the time intervals between frames in the video are decreased, and thus, a timing at which a frame image can be extracted as a still image is increased in the same recording time as the normal video mode.

Furthermore, because it is supposed to extract a frame image as a still image, a tone in the video photo mode is set to a value different from a tone value in the normal video mode. In addition, exposure setting in the normal video mode is set by a user to any one of a P mode (program mode), an A mode (aperture priority), an S mode (shutter priority), and an M mode (manual mode). On the other hand, in the video photo mode, the exposure setting is automatically set to the S mode (shutter priority).

In the normal video mode, a shutter speed is set to a value corresponding to the frame rate of a video to be recorded (for example, if a frame rate is 30 frames per second, set to 1/30 second). On the other hand, in the video photo mode, the shutter speed is set to be higher (for example, less than 1/30 second) than the frame period. In the normal video mode, the shutter speed is set to a value of about the frame rate of the video so that a smooth video is played during reproduction of the video. However, under the above-mentioned setting, such a problem occurs. Specifically, when a subject such as a moving animal is shot, a smooth image is obtained as a video, but when a still image is extracted from the video, a still image with a subject being blurred may be obtained, which means the image quality of the still image is not good. In view of this, in the present exemplary embodiment, the shutter speed in the video photo mode is set to be higher than the shutter speed in the normal video mode. According to this setting, when a frame image is extracted from a video as a still image, a high-quality still image with less blurring of a subject can be extracted. As described above, in the video photo mode, the shutter speed is set by giving preference to the image quality of a still image over the image quality of a video.

Regarding a brightness level, in the normal video mode, a certain range in a brightness level range of the digital camera is set for the reason, for example, that an image is displayed on a television receiver (TV) using HDMI (registered trademark) standard. On the other hand, in the video photo mode, it is not desirable to limit the brightness level, because the image quality of a still image takes priority. In view of this, in digital camera 100 according to the present exemplary embodiment, the brightness level is set to the maximum range of the digital camera in the video photo mode.

In the normal video mode, an aspect ratio of an image is fixed to 16:9. In the video photo mode, the aspect ratio is set to any one of 16:9, 4:3, 3:2, and 1:1 according to the user setting.

In the video photo mode, the upper limit value of an auto ISO is set to be higher than the upper limit value of ISO in the normal video mode. For example, in the normal video mode, the upper limit value of the auto ISO is set to be 6400. On the other hand, in the video photo mode, the upper limit of the auto ISO is set to be a value, such as 25600, higher than that in the normal video mode. Thus, in the video photo mode, a shutter speed higher than that in the normal video mode can be set.

In the video photo mode, the values of autofocus (AF) tracking speed, a white balance (WB) tracking speed, and an auto exposure (AE) tracking speed are also set to be higher than values in the normal video mode. If the autofocus (AF) tracking speed and the like are set to be higher, a focus is quickly changed on particularly a moving subject, so that the grade of the video is deteriorated. Therefore, high-speed autofocus (AF) control is not preferable in the normal video mode. However, in the video photo mode, the higher the autofocus (AF) speed and the like are controlled to be, the more frames in which the subject is appropriately focused are generated. Thus, a video that meets the purpose of extracting a still image can be recorded. In the video photo mode in which emphasis is placed on the image quality of a still image, the values of the autofocus (AF) tracking speed, white balance (WB) tracking speed, and auto exposure (AE) tracking speed are forcibly set to be higher values, although such a setting degrades the image quality of a video.

When the mode is set to the video photo mode, the set values suitable for recording a still image as described above are automatically (forcibly) set, whereby a video specialized for the extraction of a still image can be recorded. Therefore, the user can extract a high-quality still image from a video shot in the video photo mode.

Figure 5:
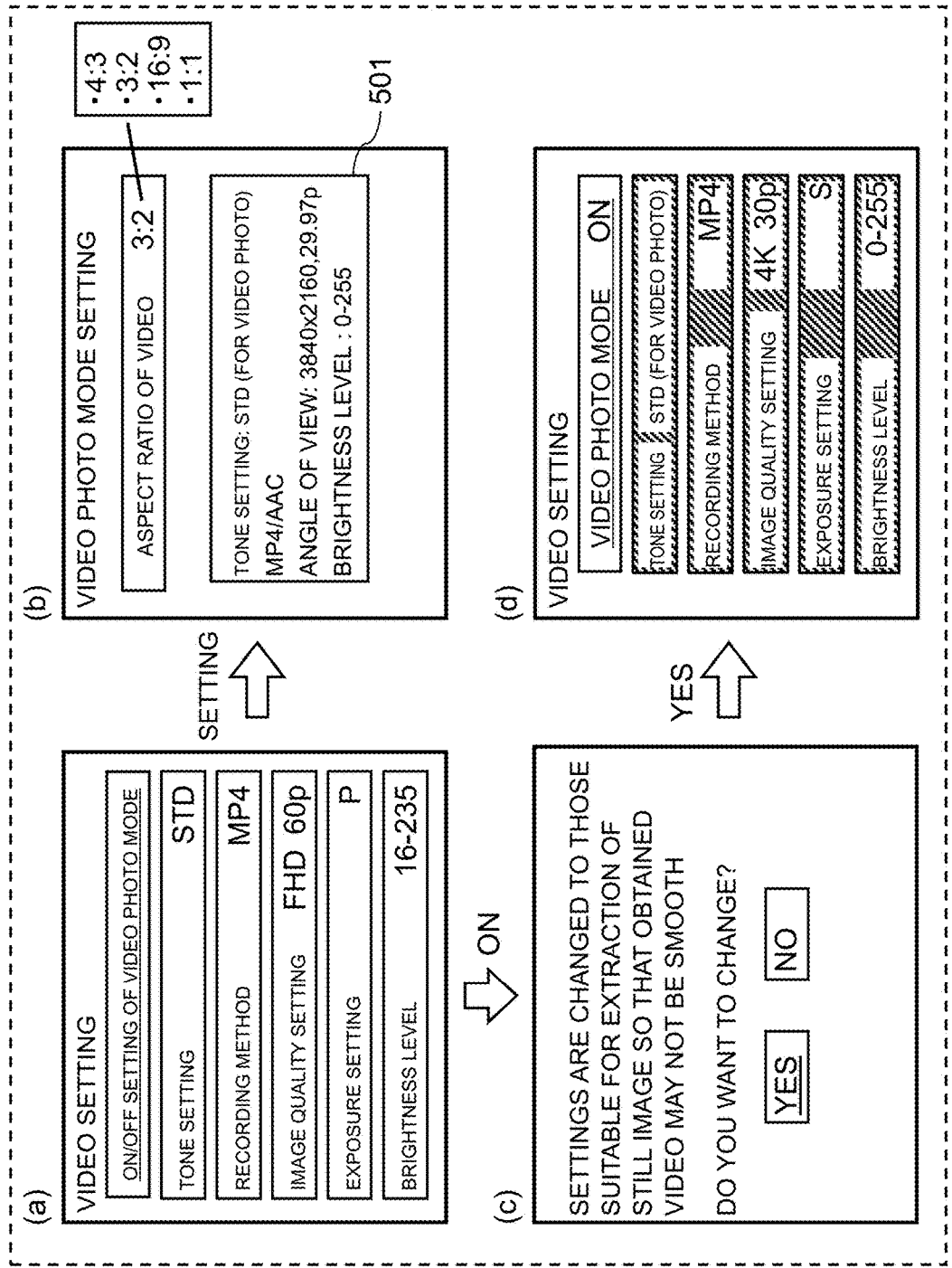
FIG. 5 is a view for describing a screen for setting the digital camera to the video photo mode.
Figure 6:
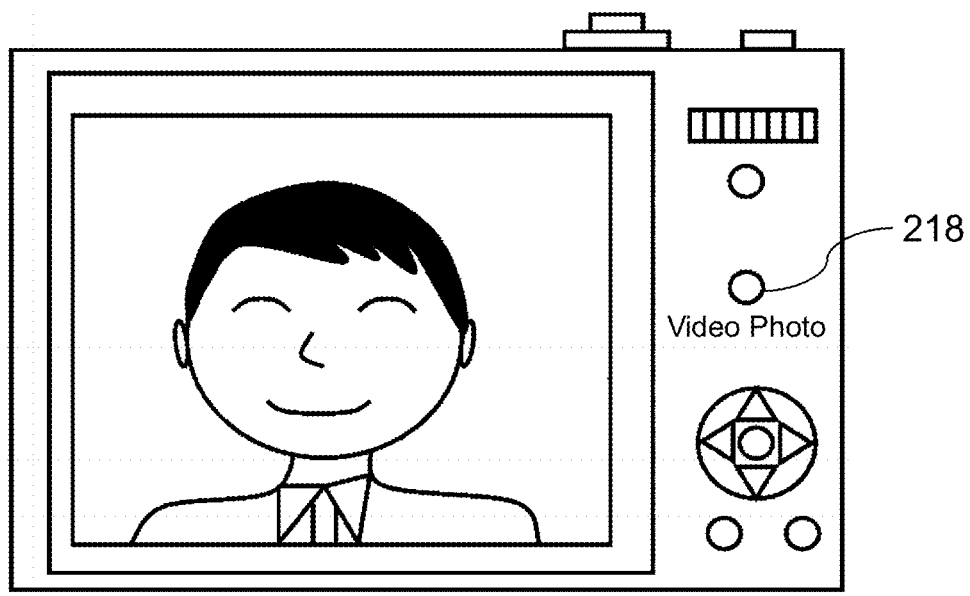
FIG. 6 is a view for describing an operation member for setting the digital camera to the video photo mode.

To set the video mode to the video photo mode, the user may select an item for selecting the video photo mode from a setting menu displayed on display monitor 220 as illustrated in part (a) of FIG. 5. Alternatively, as illustrated in FIG. 6, special button 218 for setting the video mode to the video photo mode may be provided to digital camera 100, and the video photo mode may be set by the depression of special button 218. Alternatively, the user may set the video mode to the video photo mode by operating an operation system such as a mode selection dial provided to digital camera 100.

Besides on/off of the video photo mode, the user can set various setting conditions for a video such as tone, recording method, or image quality for the video photo mode on the video setting screen in part (a) of FIG. 5. In addition, when the user selects the video photo mode setting on the video setting screen in part (a) of FIG. 5, the screen may be changed to a detailed setting screen for the video photo mode illustrated in part (b) of FIG. 5. On this screen, the user can set the aspect ratio of the video. Further, it is desirable that, on this screen, digital camera 100 displays the settings automatically set in the video photo mode. This is because it is difficult for the user to remember quite a few settings, such as an angle of view, while performing video settings. The display mentioned above can thereby improve convenience of the user. As previously described, the video photo mode is a video mode specialized for the extraction of a still image, and therefore, the image quality of a video is not necessarily excellent. Therefore, when the video photo mode is on, it is desirable that a warning screen or a reconfirming message illustrated in part (c) of FIG. 5 is presented to the user. This can prevent the situation in which the video photo mode is set without the user's intention. This can also prevent the situation in which the mode is set to a video mode with image quality not expected by the user. When the user selects the video photo mode in part (c) in FIG. 5, the screen on display monitor 220 is returned to the video setting screen. As illustrated in part (d) of FIG. 5, on this screen, it is desirable that the exposure setting, brightness level, and the like which are automatically set in the video photo mode are displayed in a manner, such as being grayed out, different from the manner in the case where they can be manually set.

In addition, when setting the video mode to the video photo mode, the user can set the mode to any one of three photo video modes described below. The user may select any one of these three video photo modes on the screen displayed on display monitor 220. Alternatively, the user may select any one of the three video photo modes by operating special button or dial provided to digital camera 100.

Figure 7:
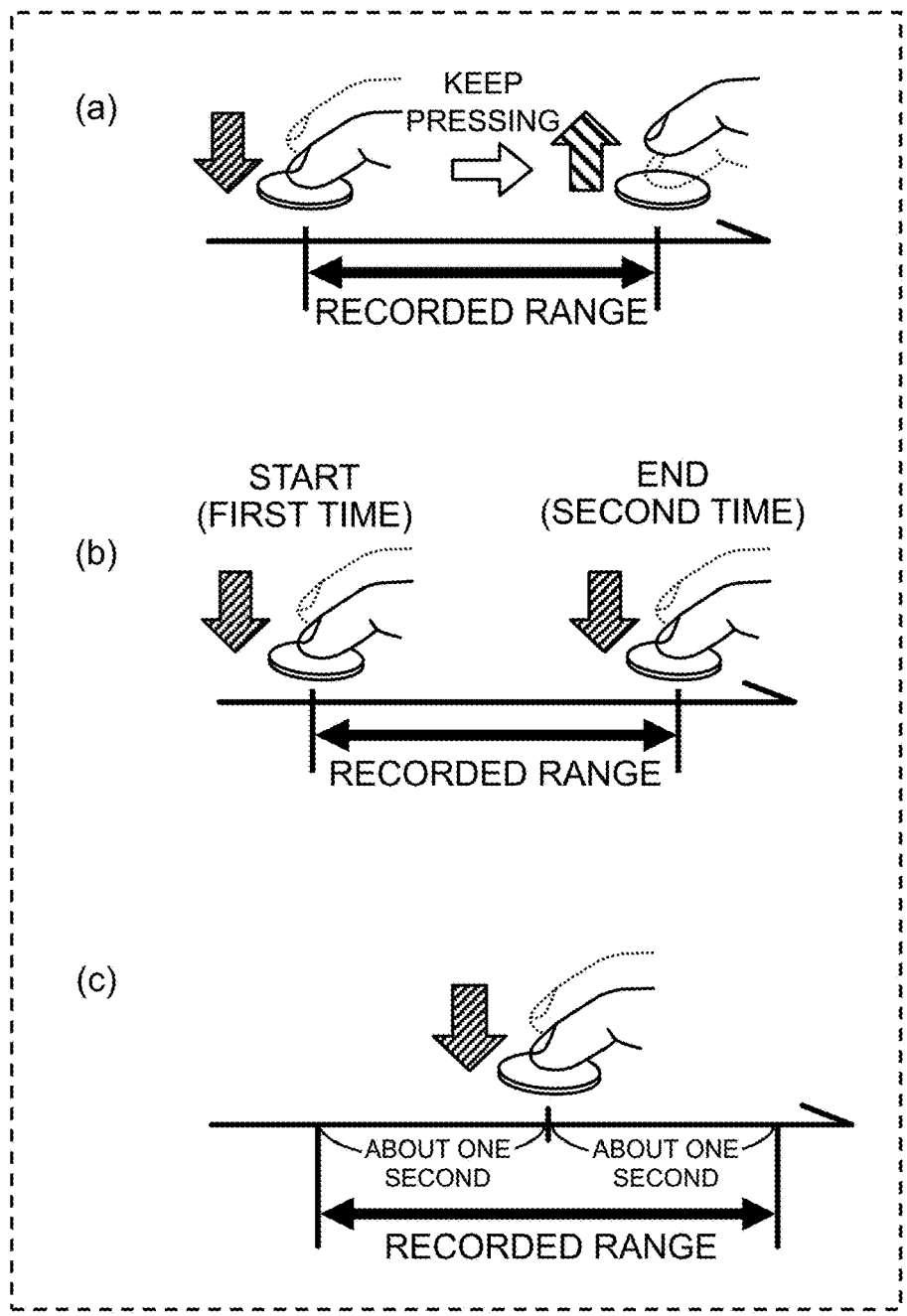
FIG. 7 is a view for describing an operation method for recording a video in three video photo modes.

Next, an operation method for recording a video in each of the three video photo modes will be described. By using these video photo modes, the decisive moment the user has failed to capture, that is, the moment which cannot be captured with the naked eye in a continuous movement or change of the subject, can be captured and created as a piece of work. FIG. 7 is a view for describing an operation method for recording a video in each of the three video photo modes.

Firstly, part (a) of FIG. 7 illustrates the operation method in the first video photo mode. The first video photo mode is effective when the user intends to capture the best moment of a fast-moving subject. This mode is effective when the user intends to shoot a sports scene or when a subject is an airplane, a railway train, or the like. In the first video photo mode, a video is recorded only while the user presses video recording button 217. During shooting, a shutter sound may continuously be issued as in normal continuous shooting. Thus, the user can shoot just like he/she performs normal continuous shooting.

Next, part (b) of FIG. 7 illustrates the operation method in the second video photo mode. The second video photo mode is effective when the user intends to capture a sudden decisive moment. For example, a photo opportunity of a subject (plants, animals, or children) that performs an unexpected movement, such as natural phenomena, is captured with prolonged continuous shooting. In the second video photo mode, when the user presses video recording button 217, video recording is started, and when the user presses video recording button 217 again, the video recording is stopped. The second video photo mode is suitable for prolonged video shooting.

Lastly, part (c) of FIG. 7 illustrates the operation method in the third video photo mode. The third video photo mode is effective when the user can predict the decisive moment to some extent but the photo opportunity period is short. For example, this mode is effective when the user intends to focus on the very moment of the photo opportunity such as the moment a ball is thrown. With this mode, the image at the decisive moment the user has failed to capture in normal shooting can be captured. When the user presses video recording button 217 just like he/she shoots a single photograph, a video for about one second each before and after the pressed moment (two seconds in total) is shot. Therefore, the user can select an image of the moment matching the desired moment from sixty frames in two seconds.

2.2 Video Recording in Video Photo Mode

The present exemplary embodiment aims to generate a still image shot at a desired moment. In view of this, in the present exemplary embodiment, when video shooting is executed several times, a process for converting video data into a single file (single-file conversion process) (described in detail later) is performed after the several times of shooting are ended. Such a single-file conversion process may be applied to either one or both of the normal video mode and the video photo mode. In the present exemplary embodiment, the single-file conversion process is applied to the video photo mode more suitable for the extraction of a still image.

A video recording operation of digital camera 100 of the present exemplary embodiment in the video photo mode will be described with reference to the flowchart in FIG. 8. It is supposed that digital camera 100 is set to the second video photo mode illustrated in part (b) of FIG. 7 in advance. Specifically, in the second video photo mode, when the user presses video recording button 217, video recording is started, and when the user presses video recording button 217 during video recording, the video recording is stopped.

Figure 9:
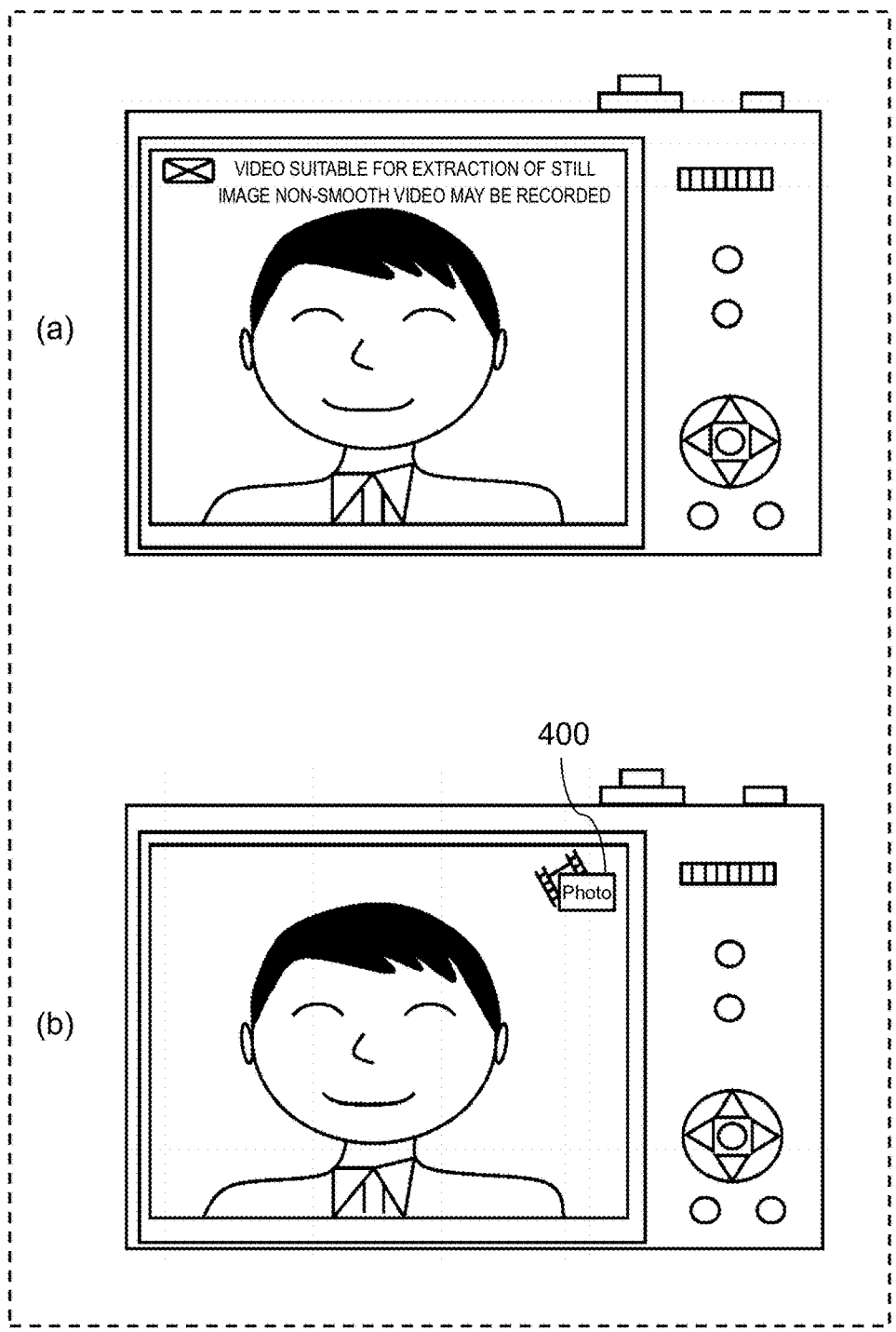
FIG. 9 is a view for describing a warning message displayed during shooting in the video photo mode.

When video recording button 217 provided on the back surface of digital camera 100 is pressed (YES in S11), controller 180 determines whether the set video mode is the normal video mode or the video photo mode. In this case, the video photo mode is set, so that controller 180 displays a warning message on display monitor 220 as shown in part (a) of FIG. 9 (S12). The warning message is for warning the user that the video photo mode is currently set. In the video photo mode, the shutter speed is set higher than that in the normal video mode, and therefore, a moving image is not smooth. Thus, the video photo mode is not suitable for shooting and playing a video. Therefore, to prevent digital camera 100 from shooting in the video photo mode against the user's intention, an icon different from that in the normal video mode is displayed and a warning is also displayed. Note that such a warning may be displayed when the video mode is changed to the video photo mode from the normal video mode. Furthermore, it is desirable that, during video recording, icon 400 is displayed on display monitor 220 as illustrated in part (b) of FIG. 9. Icon 400 clearly indicates that the mode is the video photo mode.

When the video photo mode is set, controller 180 sets the setting conditions regarding video recording to the setting conditions (see FIG. 4) for the video photo mode (S13). Notably, when the normal video mode is set, controller 180 uses the currently set setting conditions for the normal video mode.

Thereafter, controller 180 starts video recording (S14). Then, until receiving the instruction to stop the video recording, controller 180 captures and records the video based on the set conditions (S15). During video recording, the video data is encoded by image processor 160 in buffer 170, and recorded in memory card 200. However, in this stage, the video data has not yet been subjected to the single-file conversion process.

When video recording button 217 is pressed during video recording (YES in S16), controller 180 stops the video recording operation, and ends one shooting period (S17). Specifically, in the present exemplary embodiment, when the video recording button is pressed, controller 180 continuously records the captured video data in buffer 170 up to the border between groups of pictures (GOPs) thereof. Then, controller 180 causes image processor 160 to execute the encoding process to the video data. Controller 180 then stores the encoded video data into memory card 200. It should be noted that, even in this stage, the video data has not yet been subjected to the single-file conversion process.

When determining that video recording button 217 is not pressed in step S16 (NO in step S16), controller 180 continues the video recording operation until video recording button 217 is pressed (S16).

Next, controller 180 determines whether or not the video photo mode is ended (S18). For example, when the user presses power supply button 212, controller 180 determines that the video photo mode is ended. Alternatively, when the video photo mode is changed to the normal video mode by the user, controller 180 determines that the video photo mode is ended. Still alternatively, when video recording button 217 is not operated for a certain period of time, controller 180 determines that the video photo mode is ended.

When determining that the video photo mode is ended (YES in S18), controller 180 performs the process described below as the single-file conversion process (S19). Specifically, as the single-file conversion process in the present exemplary embodiment, controller 180 writes, on memory card 200 on a GOP basis, the video data encoded and stored up to the border between GOPs in memory card 200, and executes a file termination process to generate stream data. Then, controller 180 records the video data which is obtained by combining the generated stream data with a header and complies with the MP4 standard (H.264/MPEG-4AVC) into memory card 200. The above is the description of the single-file conversion process according to the present exemplary embodiment. However, it is only necessary that the single-file conversion process includes at least the file termination process, and the single-file conversion process may not include at least one of the writing process and the data combining process depending on the video recording method. After ending the single-file conversion process for converting the video into a single file, controller 180 switches driving between optical system 110 and CMOS imaging device 140 to generate a through image (S19). Note that, in the encoding process in the video photo mode, the video is recorded according to a predetermined format for video data. For example, the video is recorded in accordance with the MP4 standard.

On the other hand, in the present exemplary embodiment, when determining that the video photo mode is not ended in step S18 (NO in step S18), controller 180 does not perform the single-file conversion process. Specifically, controller 180 returns to step S11 with the encoded video data being recorded on memory card 200, and determines whether or not video recording button 217 is pressed (S11).

When controller 180 determines that video recording button 217 is pressed and this is not the video recording during the first shooting period, controller 180 starts the second video recording in step S14 without performing the processes in steps S12 and S13. Then, until receiving the instruction to stop the video recording, controller 180 performs video recording based on the set conditions (S15).

When video recording button 217 is pressed during video recording (YES in S16), controller 180 stops the video recording operation, and ends the second shooting period (S17). It is to be noted that, when video recording button 217 is not pressed in step S16 (NO in step S16), controller 180 continues the video recording operation until video recording button 217 is pressed (S15).

After that, every time video recording button 217 is pressed, controller repeats the processes in steps S11 to S17 except for the processes in steps S12 and S13, by which video recording during a new shooting period is performed.

Then, controller 180 determines whether or not the video photo mode is ended (S18). When determining that the video photo mode is ended (YES in S18), controller 180 performs the single-file conversion process for converting a plurality of video data sets recorded in memory card 200 into a single file.

Figure 8:
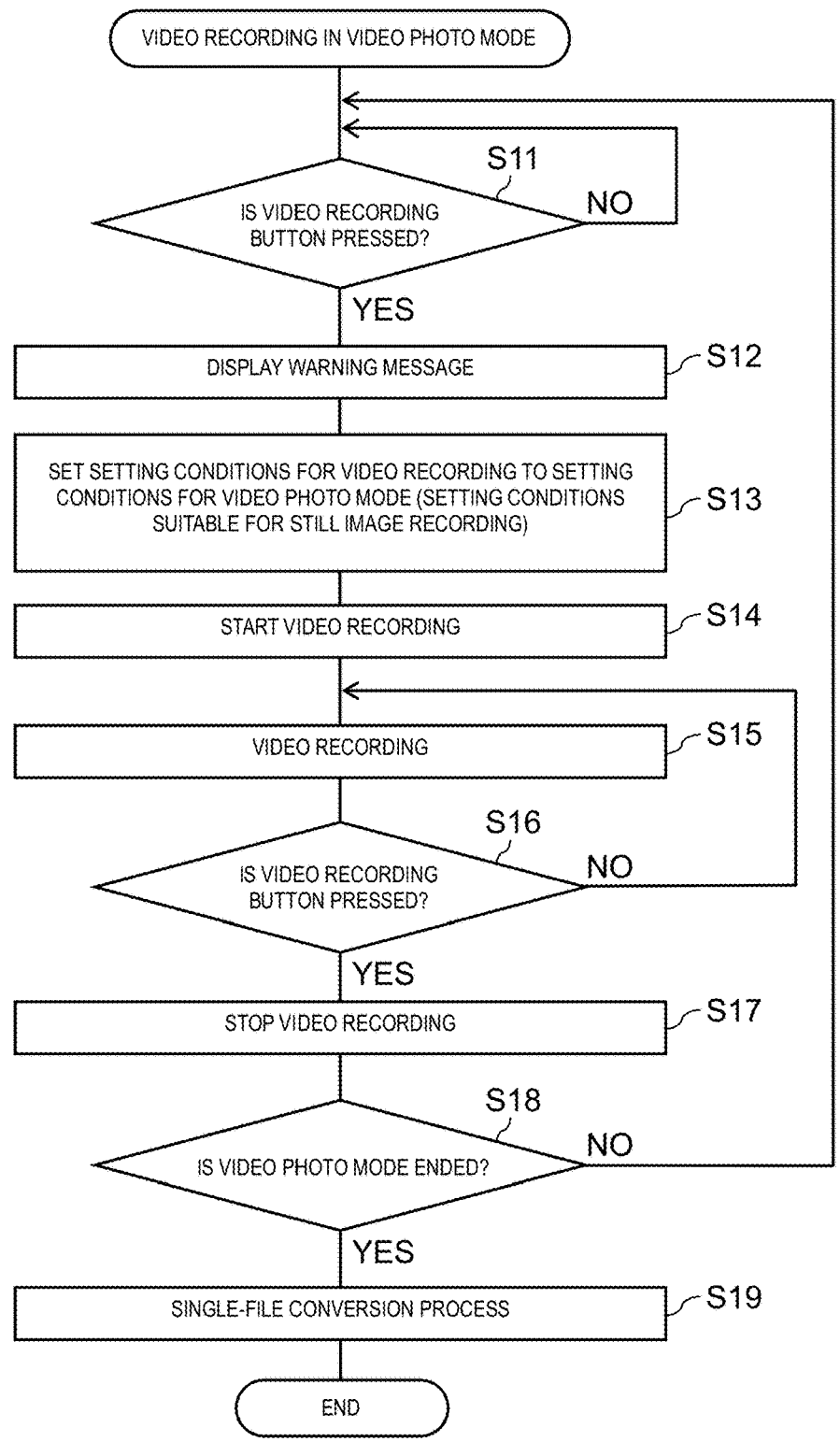
FIG. 8 is a flowchart illustrating a video recording operation of the digital camera in the video photo mode.

While digital camera 100 is supposed to be set in advance to the second video photo mode in the description with reference to FIG. 8, it may be set in advance to the first video photo mode or the third video photo mode.

Figure 10:
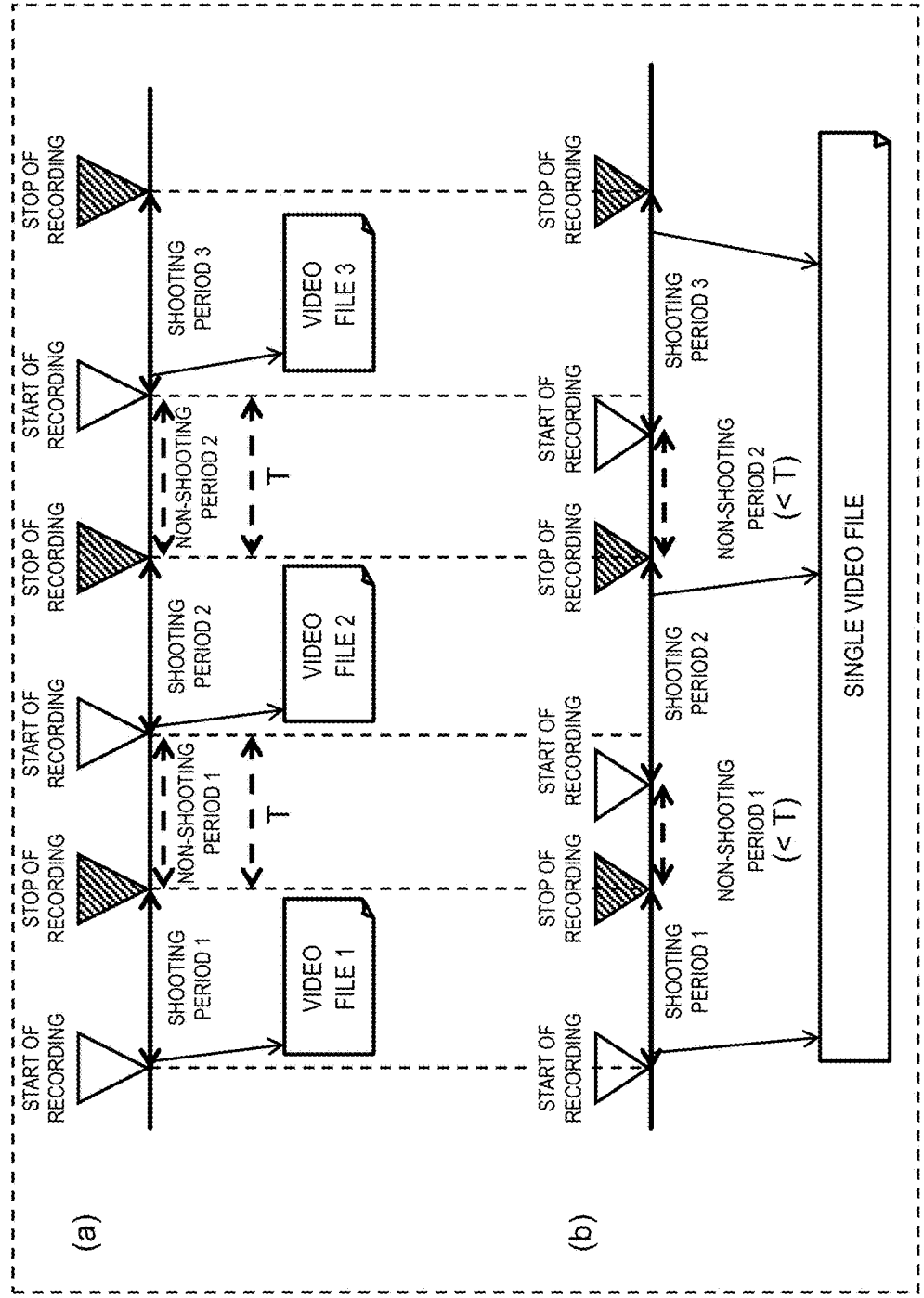
FIG. 10 is a diagram including part (a) for describing a method for generating a video file in the video photo mode according to a conventional method, and part (b) for describing a method for generating a video file in the video photo mode according to the exemplary embodiment of the present invention.

Part (a) of FIG. 10 is a diagram for describing a method for generating a video file in the video photo mode according to a conventional method, and part (b) of FIG. 10 is a diagram for describing a method for generating a video file in the video photo mode according to the exemplary embodiment of the present invention. Parts (a) and (b) of FIG. 10 illustrate several shooting periods (shooting period 1 to shooting period 3) from the start of video recording till the end of video recording in the video photo mode, and non-shooting periods (non-shooting period 1 and non-shooting period 2) between the end of the video recording in the previous shooting period till the start of video recording in the next shooting period. The non-shooting period 1 is from the end of recording in the shooting period 1 till the start of recording in the shooting period 2. The non-shooting period 2 is from the end of recording in the shooting period 2 till the start of recording in the shooting period 3. The timing of the start of recording in this case indicates the timing at which a recording start operation is executed by the user (for example, the operation of pressing video recording button 217 is performed, if the second video photo mode is set). The timing of the end of recording indicates the timing at which a recording stop operation is executed by the user (for example, the operation of pressing video recording button 217 is performed, if the second video photo mode is set). In addition, parts (a) and (b) of FIG. 10 illustrate that the initial recording is simultaneously started. Parts (a) and (b) of FIG. 10 also illustrate that the third recording is simultaneously stopped.

As illustrated in part (a) of FIG. 10, in the conventional method, the single-file conversion process similar to the process in step S19 in FIG. 8 is executed for each of the shooting periods 1 to 3, and therefore, video files 1to 3 are generated. Specifically, after the shooting period 1 is ended, the video file 1 is generated; after the shooting period 2 is ended, the video file 2 is generated; and after the shooting period 3 is ended, the video file 3 is generated. To generate the video files 1 to 3 by performing the single-file conversion process for converting the video data into a single file, a time equal to or longer than predetermined time T (for example, predetermined time T is 1.77 seconds) is needed as a time from the end of recording in the previous shooting period to the start of recording in the next shooting period in the video photo mode. Therefore, the non-shooting period 1 and the non-shooting period 2 both need to be equal to or longer than predetermined time T, which entails a problem in which the user cannot shoot at the timing he/she desires.

Figure 11:
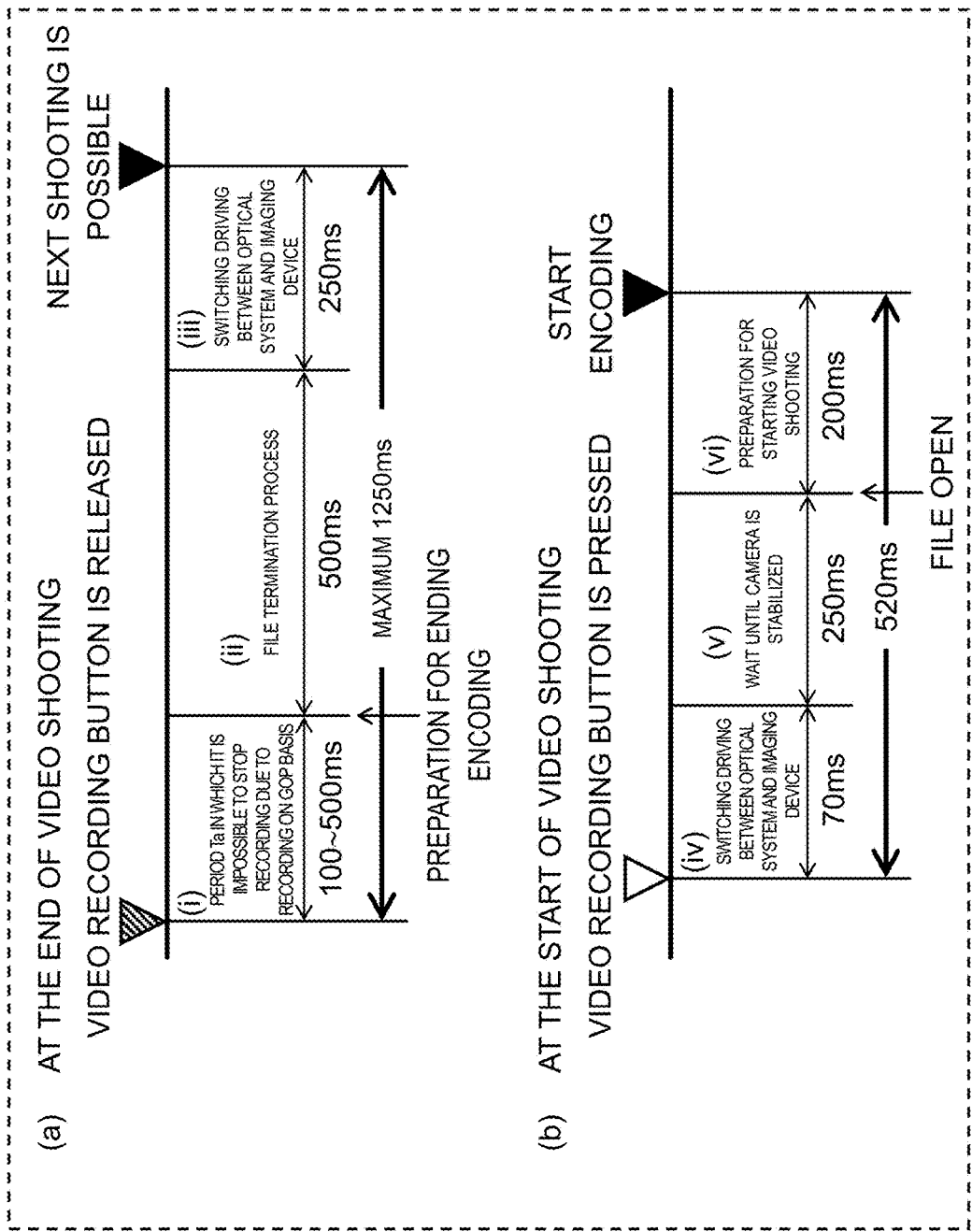
FIG. 11 is a diagram including part (a) for describing a time required at an end of video shooting according to the conventional method, and part (b) for describing a time required at a start of video shooting according to the conventional method.

The detail of predetermined time T will be described. Part (a) of FIG. 11 is a diagram for describing a time required at an end of video shooting according to a conventional method, and part (b) of FIG. 11 is a diagram for describing a time required at a start of video shooting according to the conventional method. FIG. 11 is based on that the second video photo mode is set.

According to the conventional method in which a video file is generated every shooting period, a maximum of 1250 ms are needed at the end of video shooting as illustrated in part (a) of FIG. 11. The detail will be described. After the depression of video recording button 217, 100 ms to 500 ms are needed for a "time in which it is impossible to stop recording due to recording on GOP basis" in (i). The "time in which it is impossible to stop recording due to recording on GOP basis" means a period in which it is impossible to stop shooting because the video data recording process is continued up to the border between GOPs. In addition, 500 ms are needed to perform the recording operation (single-file conversion process) including the "file termination process" in (ii) to memory card 200 through the encoding process by image processor 160 (preparation for ending encoding). That is, a maximum of 1000 ms are needed as a total of (i) and (ii). Then, to generate a through image, 250 ms are needed for performing "switching driving between optical system 110 and CMOS imaging device 140" in (iii).

Furthermore, 520 ms are needed at the start of video shooting as illustrated in part (b) of FIG. 11. The detail will be described. After video recording button 217 is pressed, 70 ms are needed for performing "switching driving between optical system 110 and CMOS imaging device 140" in (iv) for changing the setting conditions from the setting conditions for the through image to the setting conditions for video shooting. Then, 250 ms are needed for "waiting until the camera is stabilized" in (v) subsequent to (iv). After that, 200 ms are needed for "preparation for starting video shooting" in (vi) after the file opening process corresponding to the single-file conversion process in (ii). The preparation for starting video shooting means preparation for starting an encoding process.

From the above, if the conventional method is used, a maximum of 1250 ms are needed at the end of video shooting, and 520 ms are needed at the start of video shooting. Therefore, in the video photo mode, the time from the end of recording in the previous shooting period till the start of recording in the next shooting period is a maximum of 1.77 seconds (1770 ms).

The time (hereinafter referred to as a waiting time) in which the user waits from the end of video shooting till the start of video shooting is compared between the imaging apparatus according to the present exemplary embodiment and an imaging apparatus in a comparative example based on the conventional method with reference to FIG. 16. In FIG. 16, the times required for (i) to (vi) in FIG. 11 are referred to. In addition, the "time in which it is impossible to stop recording due to recording on GOP basis" in (i) in FIG. 11 is defined as Ta. The time from when the user releases video recording button 217 for stopping the video shooting till the user then presses video recording button 217 for restarting video shooting is defined as Ts.

Firstly described is a waiting time when time Ts from the depression of video recording button 217 by the user to stop video shooting till the next depression of video recording button 217 to restart video shooting is equal to or shorter than "time Ta in which it is impossible to stop recording due to recording on GOP basis" in (i) (Ts≤Ta).

If the conventional method is used, the waiting time is from the stop of video recording till the start of next video recording, and includes times (i) to (vi) in FIG. 11. Therefore, the waiting time becomes a maximum of 1770 ms.

On the other hand, in the present exemplary embodiment, different from the conventional method, the single-file conversion process for converting the video data sets captured during the respective shooting periods 1 to 3 in the video photo mode into a single file is performed after the video photo mode is ended, that is, after all shooting periods are ended, as illustrated in part (b) of FIG. 10. Therefore, (ii) in FIG. 11 is unnecessary. On the other hand, in the present exemplary embodiment, every time video recording button 217 is pressed for stopping video shooting, the process for recording the video data up to the border between GOPs is also continued, as in the conventional method. However, if Ts≤Ta, video recording button 217 for starting the next video shooting is pressed during this recording operation, and thus, controller 180 may continue the GOP-basis recording process. Therefore, the waiting time can be made substantially zero. From the above, under the condition of Ts≤Ta, the waiting time in the present exemplary embodiment can be made shorter than the conventional waiting time by a maximum of 1770 ms.

Secondly described is a waiting time when time Ts from the depression of video recording button 217 by the user to stop video shooting till the next depression of video recording button 217 to restart video shooting is longer than "time Ta in which it is impossible to stop recording due to recording on GOP basis" in (i) (Ts>Ta).

In this case, if the user desires to shorten the waiting time (if the user places emphasis on speed), controller 180 can set the image quality of the through image to be the same as the image quality at the time of shooting. In this case, it is unnecessary to switch driving between the optical system and the imaging device, whereby (iii), (iv), and (v) in FIG. 11 are unnecessary in both the present exemplary embodiment and the comparative example using the conventional method. In addition, the through image is encoded in buffer 170, and (vi) in FIG. 11 is also unnecessary in both the present exemplary embodiment and the comparative example using the conventional method.

Accordingly, in the comparative example using the conventional method, the waiting time is the total of (i) and (ii) in FIG. 11 which is a maximum of 1000 ms.

On the other hand, in the present exemplary embodiment, the time in (ii) in FIG. 11 is also unnecessary. Accordingly, the waiting time is only (i) in FIG. 11, and the next GOP may sequentially be recorded. Thus, the waiting time becomes substantially zero. From the above, under the condition of Ts>Ta where emphasis is placed on speed, the waiting time in the present exemplary embodiment becomes shorter by a maximum of 1000 ms than the waiting time in the comparative example using the conventional method. The manner of placing emphasis on speed is applied to a professional camera.

Further, a waiting time when Ts>Ta is established and emphasis is placed on power saving rather than speed is described. When emphasis is placed on power saving, controller 180 sets the image quality of the through image to be lower than the image quality at the time of shooting. In this case, after video shooting is finished, the driving is switched between the optical system and the imaging device. Therefore, the operation in (iii), (iv), and (v) in FIG. 11 are required in both the present exemplary embodiment and the comparative example using the conventional method. In addition, the preparation (preparation for starting the encoding process) for starting video shooting in (vi) is required in both the present exemplary embodiment and the comparative example using the conventional method.

In the comparative example using the conventional method, the operations in (i) and (ii) in FIG. 11 are also required. Accordingly, the waiting time becomes the total of (i) to (vi) in FIG. 11 which is a maximum of 1770 ms.

On the other hand, in the present exemplary embodiment, the time in (ii) in FIG. 11 is unnecessary. Accordingly, the waiting time becomes the total of (i) and (iii) to (vi) in FIG. 11 which is a maximum of 1270 ms. From the above, under the condition where Ts>Ta is established and where emphasis is placed on power saving, the waiting time in the present exemplary embodiment becomes shorter by a maximum of 500 ms than the waiting time in the comparative example using the conventional method.

Note that, if the processes in (ii) and (iii) in FIG. 11 are both required in the comparative example using the conventional method, the processes in (ii) and (iii) can be performed in parallel. However, in such a case, a maximum of 500 ms are required for the processes in (ii) and (iii).

2.3 Extraction of Still Image from Video Data

Figure 12:
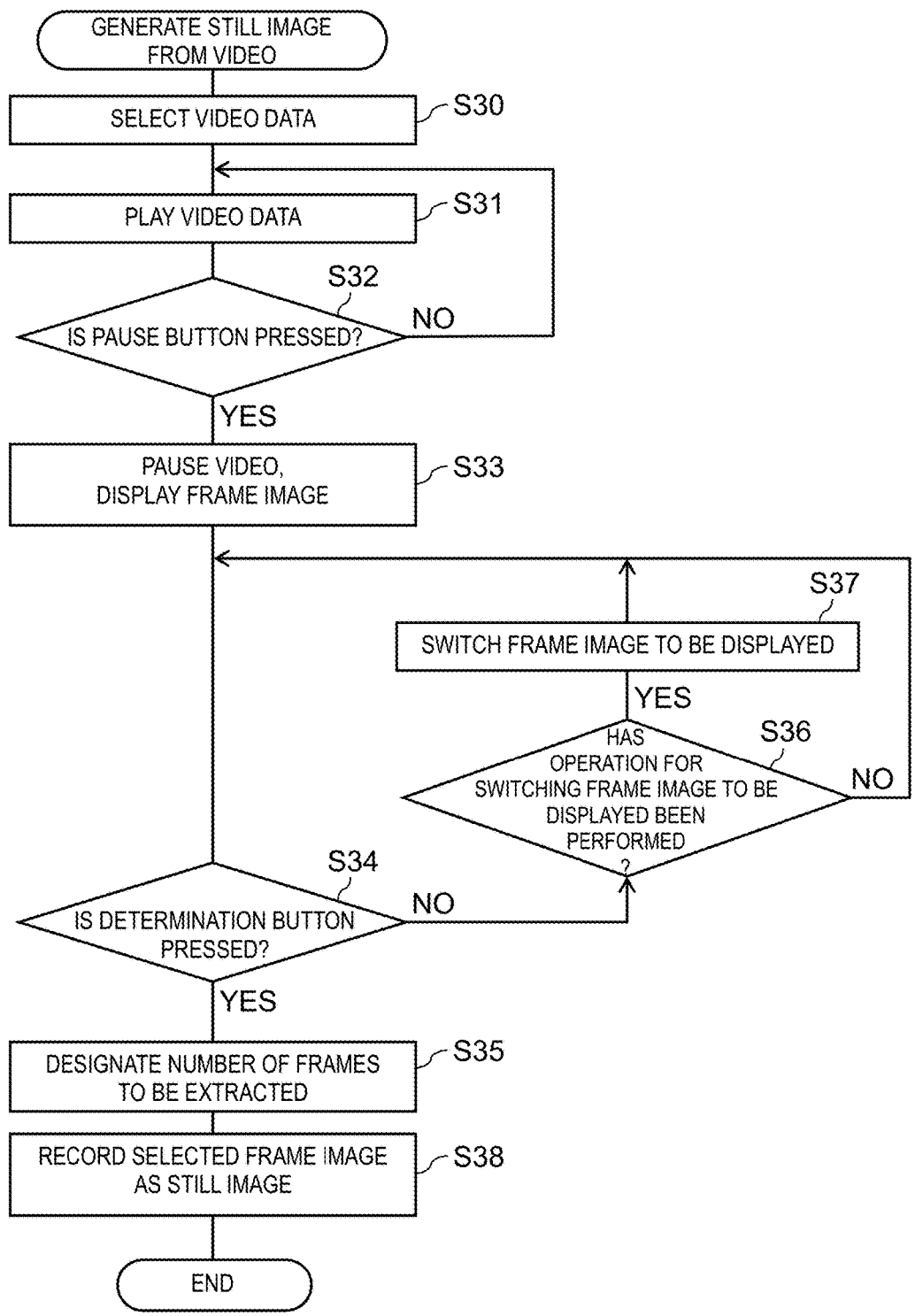
FIG. 12 is a flowchart illustrating a process of the digital camera for extracting a still image from video data.
Figure 13:
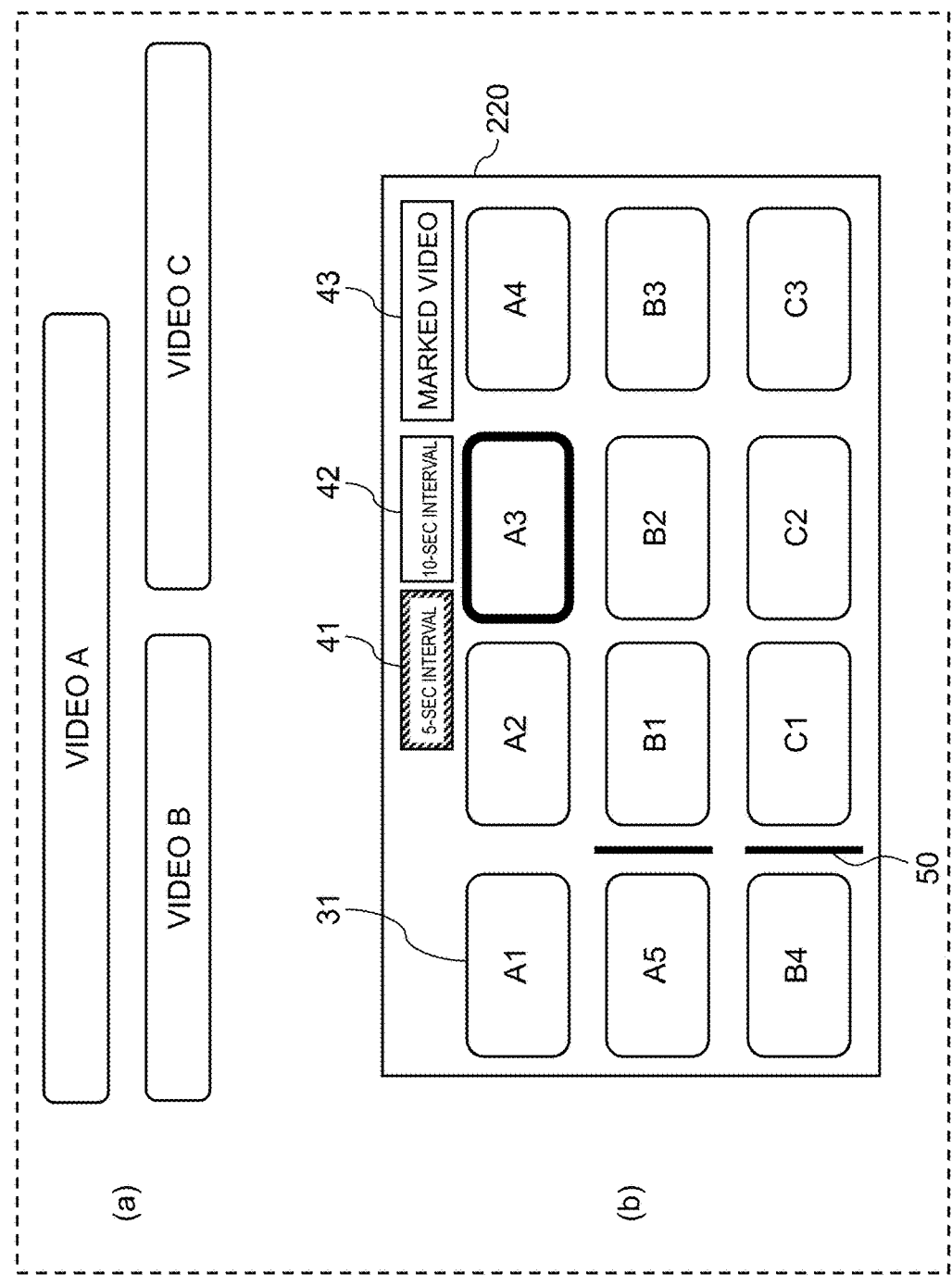
FIG. 13 is a diagram for describing a state illustrated in part (a) where three video data sets recorded in the video photo mode are stored in a memory card, and a screen illustrated in part (b) for extracting a still image from the video data sets.

A process for extracting a still image from video data recorded in the video photo mode will be described with reference to FIGS. 12 and 13. FIG. 12 is a flowchart illustrating a process for extracting a still image from video data. Part (a) in FIG. 13 illustrates three videos A, B, and C recorded in memory card 200 in the video photo mode. Part (b) in FIG. 13 illustrates an image selection screen (operation screen) used for selecting a video from which a still image is to be extracted.

When a predetermined button of digital camera 100 is pressed by the user, controller 180 displays the image selection screen illustrated in part (b) of FIG. 13 on display monitor 220. On the image selection screen, thumbnail images 31 of frames at predetermined time intervals for video A to video C are displayed. That is, on the image selection screen, representative thumbnail images of video data divided at predetermined time intervals (the image of the first frame of the divided video data) are displayed for video A to video C. In the example in part (b) of FIG. 13, representative thumbnail images are displayed for video A to video C. The representative thumbnail image is a thumbnail image corresponding to a frame image extracted every five seconds out of a plurality of frame images. For example, thumbnail images A1, A2, . . . are displayed for video A. The time interval of frames can be changed to five seconds or ten seconds by means of buttons 41 and 42. Since the thumbnail images of frames at predetermined time intervals are displayed, the user can efficiently select a video including the desired scene, and thus can quickly find the scene the user desires to extract.

Figure 14:
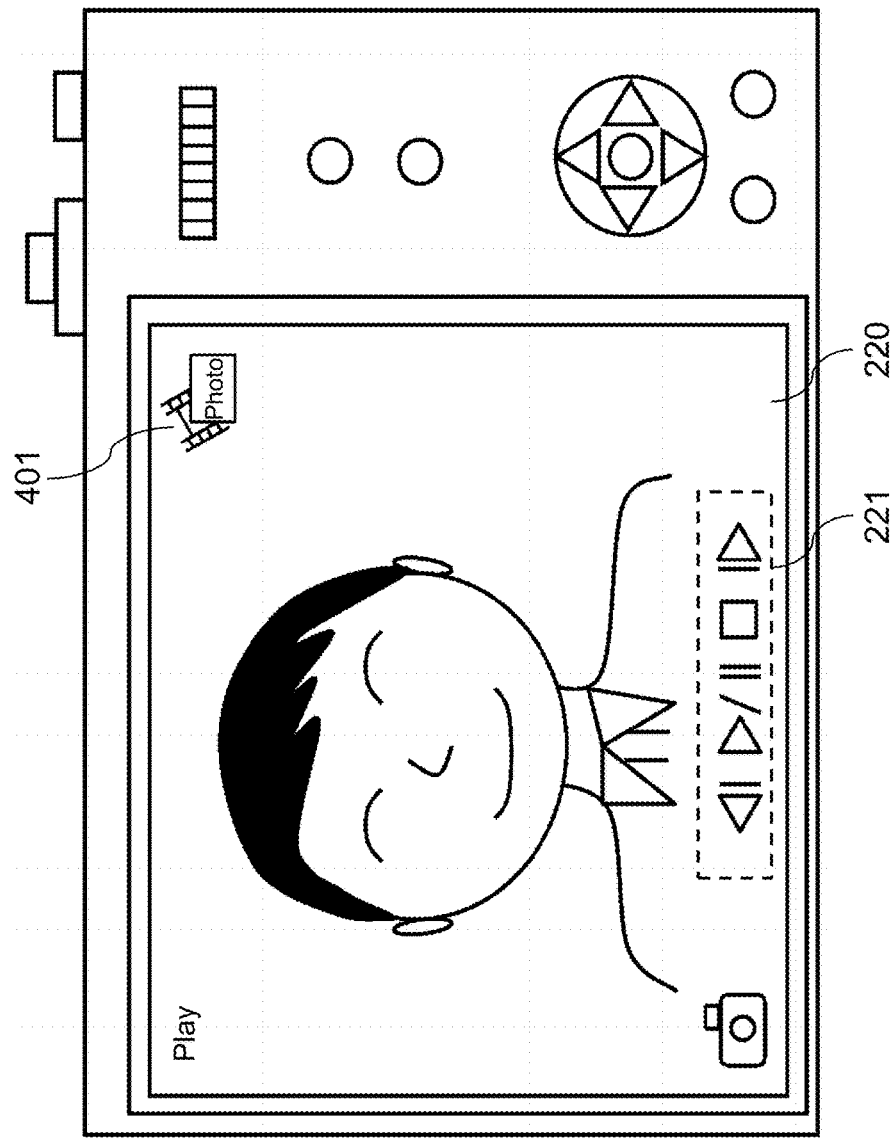
FIG. 14 is a view for describing an operation button for enabling switching between marked frames.

The user can select one of thumbnail images by moving the cursor on the image selection screen by means of selection button 213 or the touch panel provided on the back surface of the camera in FIG. 2. When one of thumbnail images is selected by the user (S30), controller 180 plays the video of the selected thumbnail image from the frames of the selected thumbnail image (S31). During playback of the image, predetermined operation button 221 illustrated in FIG. 14 is displayed on display monitor 220. The user can perform an operation of playing or stopping the video data or other operations by means of operation button 221 on the screen. When the video recorded in the video photo mode is played, icon 401 indicating the video photo mode is desirably displayed on display monitor 220. According to this display, the user can easily recognize that the video is the one recorded in the video photo mode suitable for the extraction of a still image.

When the user presses a pause button in operation button 221 during playback of the video (YES in S32), controller 180 pauses the display of the video, and displays the frame image (still image) at the paused position (S33).

Figure 15:
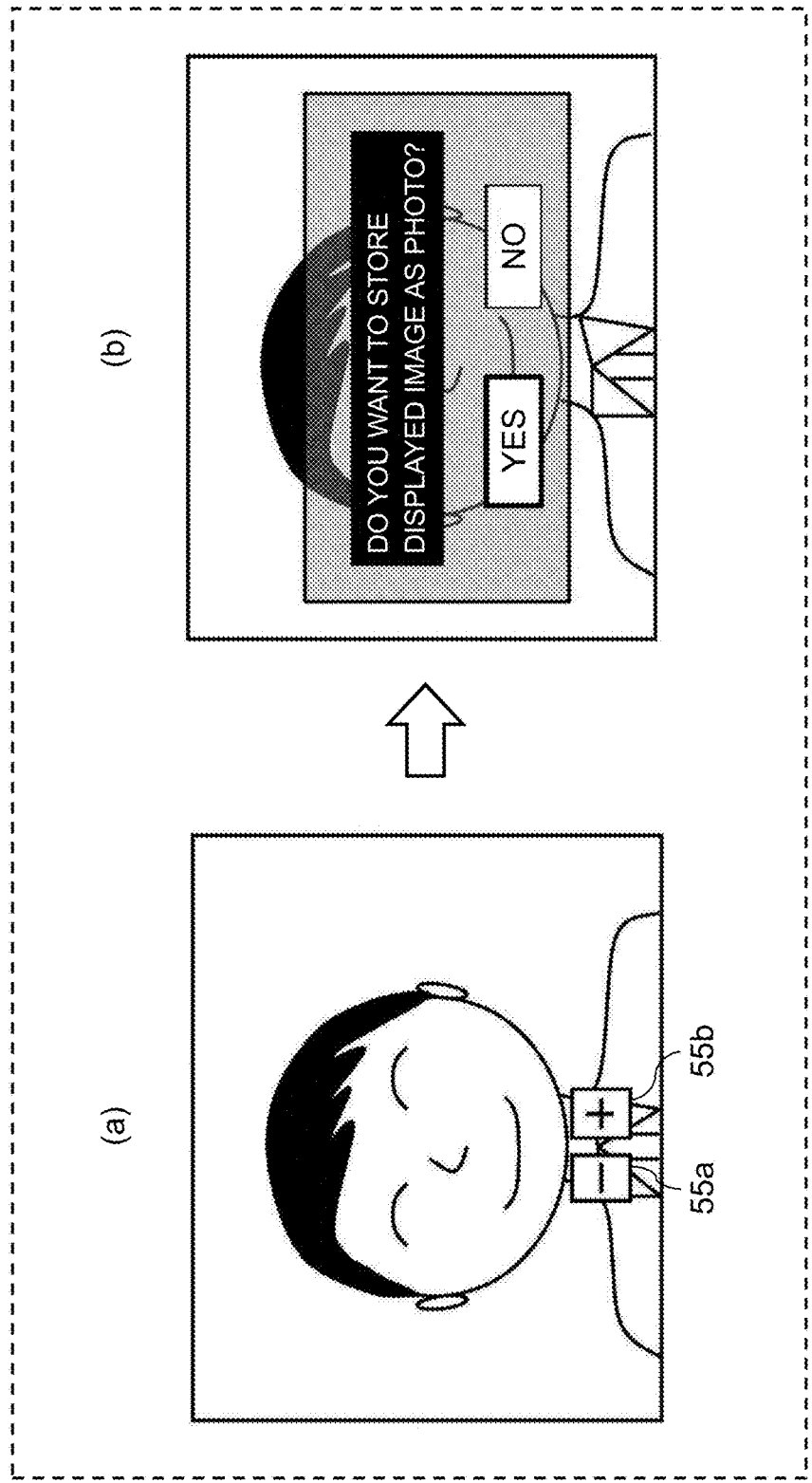
FIG. 15 is a view for describing an operation for extracting a still image from video data.

Part (a) in FIG. 15 illustrates an example of a still image displayed on display monitor 220 during a pause state. Frame advance button 55a and frame advance button 55b are displayed on display monitor 220. The user can move the still image one frame forward or one frame backward by operating frame advance button 55a and frame advance button 55b. For example, when frame advance button 55a is operated, the previous frame image of the currently displayed image is displayed on display monitor 220. When frame advance button 55b is operated, the next frame image of the currently displayed image is displayed on display monitor 220.

Returning to FIG. 12, when frame advance buttons 55a and 55b are operated by the user (YES in S36) without the depression of determination button 214 in FIG. 2 (NO in S34), controller 180 switches the image to be displayed on display monitor 220 (S37). In this way, the user displays the desired image on display monitor 220 by operating frame advance buttons 55a and 55b. If frame advance buttons 55a and 55b are not operated (NO in S36), the process returns to step S34.

When determination button 214 is pressed by the user (YES in S34), controller 180 then designates the number of frames to be extracted as a still image (S35). When the number of frames to be extracted is designated, the designated number of frames is extracted from the currently displayed image (frame image) as a still image, and recorded in memory card 200 (S38). Specifically, when determination button 214 is pressed in step S34, a confirmation message for the user illustrated in part (b) of FIG. 15 is displayed. When a user's instruction ("YES") is input in response to the confirmation message, controller 180 extracts the currently displayed frame data from the video data, and records the extracted data as a still image in memory card 200. Note that the video data recorded in the video photo mode is recorded in a video format (MP4), and is subjected to inter-frame compression. Accordingly, when a frame of the video data is extracted as a still image, controller 180 converts the format of the data of the frame image into a format (e.g., JPEG) for a still image, and then, records the resultant data.

In this way, still image data can be extracted from video data.

On the image selection screen in part (b) of FIG. 13, thumbnail images B1, B2, . . . for video B and thumbnail images C1, C2, . . . for video C are displayed subsequent to thumbnail images A1, A2, . . . for video A. In this way, the thumbnail images for video A, video B, and video C are continuously displayed. Therefore, display 50 indicating a break point at the boundary between videos is displayed to show the border between videos.

3. Effects and Other Remarks

The imaging apparatus (for example, digital camera 100) according to the present exemplary embodiment is an imaging apparatus that shoots a video. The imaging apparatus includes: an imaging unit (CMOS imaging device 140) that generates image data based on optical information input through an optical system (optical system 110); an image processor (image processor 160) that generates video data based on the image data; and a controller (controller 180) that, when a shooting period in which the video is shot has a first shooting period from a start of first recording till an end of the first recording and a second shooting period from a start of second recording and an end of the second recording, generates a single file using, out of the video data, first video data corresponding to the video shot during the first shooting period and second video data corresponding to the video shot during the second shooting period.

Specifically, in the present exemplary embodiment, when there are a plurality of shooting periods for a video from a start of recording till an end of the recording, video data sets shot during the shooting periods are recorded as a single file. Therefore, the time from the stop of shooting till the start of shooting can be shortened. Accordingly, the user can operate the shutter just like he/she does so in shooting a still image, and thus, the present exemplary embodiment is effective for preventing the user from missing a photo opportunity.

In addition, in the present exemplary embodiment, when the second shooting period is set after the first shooting period, the controller controls the image processor such that a termination process for the single file is executed after the second shooting period.

Specifically, in the present exemplary embodiment, a file termination process is executed as a part of a single-file conversion process for converting the video data sets generated during a plurality of shooting periods into a single file. Therefore, the time from the stop of shooting till the start of shooting can be shortened.

In addition, in the present exemplary embodiment, the controller has a first video mode (for example, normal video mode) and a second video mode (for example, video photo mode) as a mode for shooting a video. The controller automatically sets setting conditions regarding video shooting to predetermined setting conditions suitable for a still image generated from the video in the second video mode. When the shooting period in which the video is shot has the first shooting period and the second shooting period, the controller generates the single file using the first video data and the second video data in the second video mode.

Specifically, digital camera 100 according to the present exemplary embodiment has, in addition to a normal video mode, a video photo mode that enables extraction of a high-quality still image. The user can shoot a video in the video photo mode, and then, extract a desirable still image from the shot video. In addition, in the present exemplary embodiment, video data sets shot during a plurality of shooting periods in the video photo mode are recorded as a single file. Therefore, the time from the stop of shooting till the start of shooting can be shortened. Accordingly, the imaging apparatus is effective to prevent the user from missing a photo opportunity.

Moreover, in the present exemplary embodiment, when determining that the second video mode is ended, the controller generates a single file using the first video data and the second video data.

For example, in the present exemplary embodiment, when the power supply of digital camera 100 is turned off, or digital camera 100 is switched to the normal video mode from the video photo mode, a single-file conversion process for converting video data sets generated during a plurality of shooting periods into a single file is automatically executed. Thus, in the present exemplary embodiment, the single-file conversion process can be executed without requiring a user's special operation for the single-file conversion process.

Other Exemplary Embodiments

The first exemplary embodiment has been described above as an example of the technology disclosed in the present disclosure. However, the technology according to the present disclosure is not limited to the first exemplary embodiment described herein, but may be applicable to other exemplary embodiments including appropriate modifications, replacements, additions, omissions and the like. In addition, new exemplary embodiments can be made by combining constituents described in the above first exemplary embodiment. Therefore, other exemplary embodiments will be described below.

(1) In the exemplary embodiment described above, the specific conditions illustrated in FIG. 4 are shown as setting conditions suitable for recording a still image. However, the setting conditions suitable for recording a still image are not limited to the values shown in FIG. 4. The setting conditions suitable for recording a still image may include items other than the setting items shown in FIG. 4. Further, the setting conditions may not necessarily include all items in FIG. 4, but may include some of these items.

(2) In the exemplary embodiment described above, the digital camera has been described as an example of an imaging apparatus. However, the imaging apparatus is not limited thereto. The idea of the present disclosure is applicable to various imaging apparatuses such as digital video cameras, smartphones, wearable cameras, and digital movies which can shoot videos.

(3) In the exemplary embodiment described above, an imaging device is configured as a CMOS imaging device. However, the imaging device is not limited thereto. Another image sensor may be used as the imaging device. Examples of the other image sensors include an n-channel metal-oxide semiconductor (NMOS) image sensor and a charge coupled device (CCD) image sensor.

(4) The video photo mode disclosed in the exemplary embodiment described above is applicable to both interchangeable lens cameras and cameras with built-in lenses.

(5) An icon or the like for distinguishing a video recorded in the video photo mode from a video shot in the normal video mode may be displayed on the video recorded in the video photo mode in the exemplary embodiment described above.

(6) In the exemplary embodiment described above, when the user presses power supply button 212, controller 180 determines that the video photo mode is ended. However, the configuration is not limited thereto. For example, as illustrated in FIG. 6, special button 218 for setting the mode to the video photo mode may be provided, and when special button 218 is pressed, controller 180 may determine that the video photo mode is ended. Alternatively, a mode selection dial is provided, and the video photo mode (or three video photo modes) is set to the mode selection dial. When an operation for switching the mode from the video photo mode is performed on the mode selection dial, controller 180 may determine that the video photo mode is ended.

(7) The above exemplary embodiment has described that an operation of the single-file conversion process for converting video data sets generated during several shooting periods in the video photo mode into a single file is performed after the several shooting periods. However, the single-file conversion process for converting video data sets generated during several shooting periods in the normal video mode into a single file may be performed after the several shooting periods. This configuration can also prevent the user from missing a photo opportunity.

(8) In the exemplary embodiment described above, digital camera 100 has both the video photo mode and the normal video mode as the video mode. However, it may have only one of these modes.

(9) The above exemplary embodiment discloses, in the description of the video recording operation in FIG. 8, the video recording operation in the second video photo mode in part (b) of FIG. 7. However, the same operation can also be executed in the first video photo mode in part (a) of FIG. 7 and the third video photo mode in part (c) FIG. 7. In the first video photo mode, the determination of whether the video recording button is pressed or not in step S16 is replaced by determination of whether the depression of the video recording button by the user is stopped or not (whether or not the user releases his/her finger from the video recording button). In the third video photo mode, the determination of whether the video recording button is pressed or not in step S16 is replaced by determination of whether a predetermined time (for example, one second) has elapsed from the depression of the video recording button.

(10) In the exemplary embodiment described above, digital camera 100 is provided with a storage unit (for example, memory card 200) storing a file generated by the single-file conversion process. However, the storage unit may not be included in digital camera 100. For example, digital camera 100 may transmit image data (file) to an external recorder, and the external recorder may record the file.

As described above, the exemplary embodiment has been described as an example of the technology disclosed in the present disclosure. For this purpose, the attached drawings and detailed descriptions have been presented. Therefore, the constituents described in the accompanying drawings and the detailed description include not only the constituents essential for solving the problem but also constituents that are not essential for solving the problem in order to illustrate the technologies. It should not be therefore determined that the unessential constituents in the accompanying drawings and the detailed description are essential only based on the fact that these constituents are included in the drawings and the description. Furthermore, since the exemplary embodiment described above is intended to illustrate the technology in the present disclosure, various changes, substitutions, additions, omissions, and the like can be made within the scope of the claims and the scope of equivalents thereof.

The present disclosure is applicable to an imaging apparatus which can shoot videos. Specifically, the present disclosure is applicable to various imaging apparatuses such as digital video cameras, smartphones, wearable cameras, and digital movies that can shoot videos.

What is claimed is:

1. An imaging apparatus that shoots a video, the imaging apparatus comprising:
   an imaging unit that generates image data based on input optical information;
   an image processor that generates video data based on the image data;
   a controller that generates a single file using, out of the video data, first video data and second video data; and
   a video record button which accepts an operation for starting of video recording and accepts an operation for stopping of the video recording, wherein:
   when the video record button accepts a first start operation for starting of video recording, the recording of the moving image is started, and when the video record bottom accepts a first stop operation for stopping of the video recording, the recording of the moving image is ended, thereby the first video data corresponding to the video shot during a first shooting period generated,
   when the video record button accepts a second start operation for starting of video recording, the recording of the moving image is started, and when the video record button accepts a second stop operation for stopping of the video recording, the recording of the moving image is ended, thereby the second video data corresponding to the video shot during a second shooting period is generated, and
   when the record button is not operated for a certain period of time, the controller generates and stores in non-transitory computer readable medium the single file for subsequent user access using the first video data and the second video data.

2. The imaging apparatus according to claim 1, wherein, when the second shooting period is set after the first shooting period,
   the controller controls the image processor such that a termination process for the single file is executed after the second shooting period.

3. The imaging apparatus according to claim 1, wherein the controller has, as a mode for shooting the video, a first video mode and a second video mode,
   the controller automatically sets a setting condition regarding shooting of the video in the second video mode such that at least one still image generated from the video shot in the second video mode has higher image quality than at least one still image generated from the video shot in the first video mode, and
   when the shooting period in which the video is shot has the first shooting period and the second shooting period in the second video mode, the controller generates the single file using the first video data and the second video data.

4. The imaging apparatus according to claim 3, wherein when determining that the second video mode is ended, the controller generates the single file using the first video data and the second video data.

* * * * *